(12) United States Patent
McGrogan et al.

(10) Patent No.: US 8,948,942 B2
(45) Date of Patent: Feb. 3, 2015

(54) PRE-EMPTIVE OUTPUT TORQUE REDUCTION FOR A TRANSIENT SPEED EVENT AND PRIORITIZATION OF INERTIA

(75) Inventors: Sean W. McGrogan, Ann Arbor, MI (US); Anthony H. Heap, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 889 days.

(21) Appl. No.: 13/160,908

(22) Filed: Jun. 15, 2011

(65) Prior Publication Data

US 2012/0323416 A1 Dec. 20, 2012

(51) Int. Cl.
B60L 15/20 (2006.01)
(52) U.S. Cl.
CPC ........................................ B60L 15/20 (2013.01)
USPC .......................................................... 701/22
(58) Field of Classification Search
CPC ...... B60L 15/00; B60L 15/20; B60L 2240/40; B60L 2240/423; B60W 20/00; B60W 2510/083; B60W 2510/105
USPC ............ 701/22, 51, 53, 54, 84, 99, 101, 102; 477/3, 98, 115; 903/930; 180/65.1, 180/65.21, 65.265
See application file for complete search history.

(56) References Cited

U.S. PATENT DOCUMENTS

| | | | | |
|---|---|---|---|---|
| 5,797,110 | A * | 8/1998 | Braun et al. | 701/84 |
| 6,259,986 | B1 * | 7/2001 | Kotwicki | 701/101 |
| 8,340,877 | B2 * | 12/2012 | Murayama et al. | 701/54 |
| 2009/0308674 | A1 * | 12/2009 | Bhattarai et al. | 180/65.265 |
| 2009/0326778 | A1 * | 12/2009 | Soliman et al. | 701/84 |
| 2010/0042277 | A1 * | 2/2010 | Naik et al. | 701/22 |
| 2010/0261578 | A1 * | 10/2010 | Fujii et al. | 477/115 |
| 2010/0262344 | A1 * | 10/2010 | Fujii et al. | 701/55 |
| 2012/0101705 | A1 * | 4/2012 | Templin | 701/99 |
| 2012/0158257 | A1 * | 6/2012 | Stursa et al. | 701/52 |

OTHER PUBLICATIONS

U.S. Appl. No. 13/162,767, Sean McGrogan.
U.S. Appl. No. 13/160,937, Sah et al.
U.S. Appl. No. 13/163,668, Heap et al.
U.S. Appl. No. 13/161,584, McGrogan et al.
U.S. Appl. No. 13/161,602, Sah et al.
U.S. Appl. No. 13/152,380, Arnett et al.
U.S. Appl. No. 13/162,720, Martini et al.
U.S. Appl. No. 13/163,115, Sah et al.
U.S. Appl. No. 13/029,381, Michael Arnett.

* cited by examiner

*Primary Examiner* — Mary Cheung
*Assistant Examiner* — Rodney Butler

(57) ABSTRACT

A method to control an output torque of a powertrain in response to an incipient transient speed event within the powertrain includes determining an incipient transient speed event, determining a maximum output torque capability profile based upon the incipient transient speed event, determining a minimum value of the maximum output torque capability profile, and limiting the output torque to not greater than the minimum value of the maximum output torque capability profile until the incipient transient speed event is concluded.

20 Claims, 3 Drawing Sheets

PRE-EMPTIVE OUTPUT TORQUE REDUCTION FOR A TRANSIENT SPEED EVENT AND PRIORITIZATION OF INERTIA

TECHNICAL FIELD

This disclosure is related to control of a powertrain.

BACKGROUND

The statements in this section merely provide background information related to the present disclosure. Accordingly, such statements are not intended to constitute an admission of prior art.

A powertrain can include a number of torque generative devices selectively connected to provide torque to the powertrain. A number of shafts connect various parts of the powertrain, and speed changes to the shafts can be commanded based upon transitions required in the powertrain.

A powertrain can permit operation of the powertrain in a plurality of configurations. These configurations include a plurality of gear states defining a relationship of a transmission input speed and transmission input torque to a transmission output speed and transmission output torque. Transitions or shifts between gear states include transitioning at least one engaged clutch to a disengaged state or at least one disengaged clutch to an engaged state.

Desired operation of the powertrain can be monitored through an input device such as an operator pedal position or through a cruise control system. Desired operation can be processed as an output torque request signal. Based upon the output torque request signal, an engine, electric motor, and/or other torque generative devices are operated to deliver the requested operation of the powertrain. Changing a gear state in response to a requested change to output torque, for example transitioning between gear states or hybrid drive configurations, can temporarily impact the maximum output torque capability of the powertrain.

SUMMARY

A method to control an output torque of a powertrain in response to an incipient transient speed event within the powertrain includes determining an incipient transient speed event, determining a maximum output torque capability profile based upon the incipient transient speed event, determining a minimum value of the maximum output torque capability profile, and limiting the output torque to not greater than the minimum value of the maximum output torque capability profile until the incipient transient speed event is concluded.

BRIEF DESCRIPTION OF THE DRAWINGS

One or more embodiments will now be described, by way of example, with reference to the accompanying drawings, in which.

DETAILED DESCRIPTION

Figure 1:
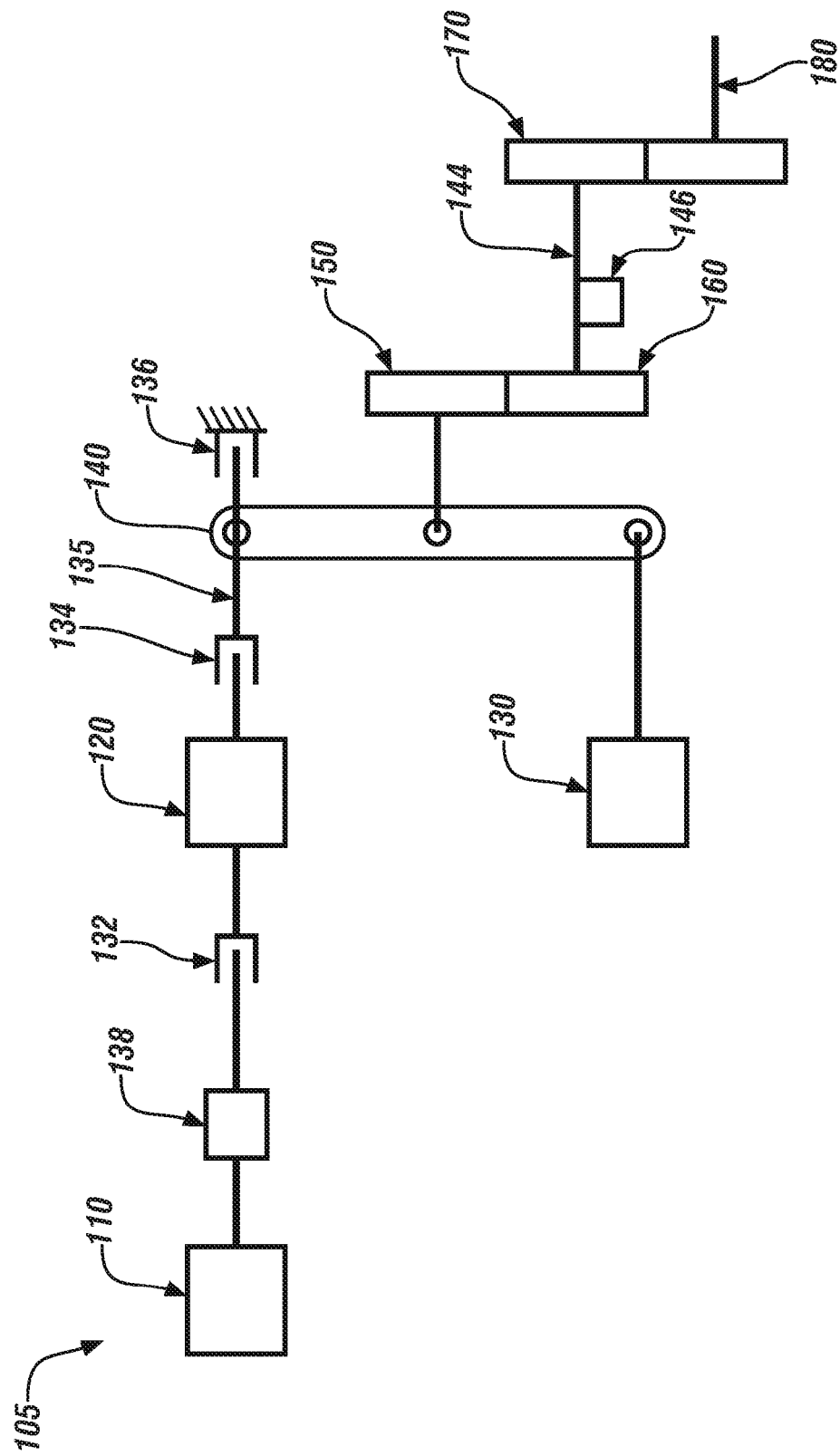
FIG. 1 illustrates an exemplary electric drive powertrain, in accordance with the present disclosure.

Referring now to the drawings, wherein the showings are for the purpose of illustrating certain exemplary embodiments only and not for the purpose of limiting the same, FIG. 1 illustrates an exemplary electric drive powertrain 105 including an internal combustion engine 110 functioning as a range extender, a first electric motor 120, a second electric motor 130, a planetary gear set 140, transfer gears 150, 160, and 170, and output shaft 180. Powertrain 105 can be operated in any of a number of configurations based upon selective operation of engine 110 and motors 120 and 130. Further, powertrain 105 includes clutches 132, 134, and 136 which can be engaged or disengaged to change the configuration of the powertrain. Clutch 132 selectively mechanically couples engine 110 to motor 120. Clutch 134 selectively mechanically couples motor 120 to a gear of planetary gear set 140. Clutch 136 selectively grounds the same gear of planetary gear set 140. Transmission output speed sensor 146 monitors a speed of shaft 144 between transfer gears 160 and 170. Damper 138 is between engine 110 and motor 120 to provide a damping or smoothing of the interaction between the engine 110 and the motor 120.

Motors 120 and 130 can supply torque to powertrain 105. According to one exemplary embodiment, engine 110 is used to provide torque to motor 120 for the purpose of regenerating an energy storage device supplying electrical energy to motors 120 and/or 130. In such a function, supplying torque for a purpose of regeneration rather than supplying torque to the powertrain for the purpose of driving the output shaft, powertrain 105 is referred to as an electric drive powertrain and engine 110 is referred to as a range extender.

Control of a powertrain can depend upon a number of different inputs. For example, powertrain control can include controlling torque generation based upon an output torque request ($T_{O\_REQ}$) or a desired torque to be delivered to the output shaft of the powertrain. According to one exemplary control method, inputs from an operator are monitored by a control module, for example, including an accelerator pedal position, and the inputs are utilized to generate $T_{O\_REQ}$. Depending upon the particular powertrain, the output torque request can be used by various control modules, including a transmission control module, a hybrid control module, an engine control module, or a motor control module, to command the various components to the powertrain to deliver torque to the output shaft according to the output torque request. Motors and the engine of a hybrid drive powertrain or an electric drive powertrain receive torque commands from a control module and operate based upon those torque commands.

Powertrain control can additionally change a mode in which the powertrain is operating or otherwise adjust speeds within the powertrain independently of the output torque or output speed. For example, a hybrid drive powertrain including an engine and a plurality of electric motors connected through a planetary gear set can operate in a wide variety of modes to deliver a particular output torque and output speed from the powertrain. Additionally, by controlling the inputs to the planetary gear set, different engine and motor torques and speeds can deliver a same output torque and speed. A hybrid control module can monitor various inputs including the current operation of the powertrain and available energy in an energy storage device, and the hybrid control module can command changes to engine speed and torque and to motor speeds and torques depending upon desired operation of the powertrain.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any controller executable instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 3.125, 6.25, 12.5, 25 and 100 milliseconds during ongoing engine and vehicle operation. Alternatively, routines may be executed in response to occurrence of an event.

Engine 110, electric motor 120, and electric motor 130 operate in a plurality of configurations of the powertrain or powertrain modes to provide output torque to shaft 180. In one mode, electric motor 130 can provide output torque and engine 110 can be used to drive electric motor 120 to provide electrical energy to the powertrain or for energy recovery to an associated energy storage device. In another mode, electric motor 120 and 130 can operate cooperatively to provide torque while engine 110 is disconnected from motor 120.

In some circumstances, a transition including a change in a speed of a transmission input or other shaft within the powertrain can be completed in a particular mode based upon changing an output of one or more of the torque generative devices currently providing torque. In other circumstances, a gear state can additionally be changed altering a relationship of transmission input speed or other shaft speeds within the powertrain to transmission output speed, for example, with a transmission device changing from a second to a third gear in response to a commanded change. In other circumstances, a powertrain mode or a hybrid drive mode can additionally be changed including altering which torque generative devices are being utilized to provide torque. Depending upon the circumstances of the transition, an output torque capability of the powertrain can vary through the transition. If the output torque capability of the powertrain throughout the transition is in excess of $T_{O\_REQ}$, then the powertrain can simply deliver output torque to match $T_{O\_REQ}$. However, details of the transition, including transitioning clutches, requirements to change a speed of a shaft, or changing which devices are providing torque can cause the output torque capability of the powertrain to fall below $T_{O\_REQ}$. In such a circumstance, the operator of the vehicle can perceive the failure of the vehicle to produce the requested torque as an adverse impact to drivability. As the powertrain completes the transition and reaches a desired configuration capable of delivering $T_{O\_REQ}$, the powertrain can change output torque as requested. Such transitions may indicate an incipient transient speed event.

Operating the powertrain through a transition based upon delivering an output torque equal to an output torque capability of the powertrain enables the powertrain to deliver a local maximum of output torque through the transition. If the output torque is permitted to simply follow the maximum output torque capability of the powertrain through the transition, the resulting acceleration of the vehicle can increase and decrease according to the dynamic output torque capability of the powertrain and can appear to the operator to be failing to meet the requested output torque. In one embodiment, upon determining that a drop in output torque capability is impending, a drop that could result in an uncontrolled drop in actual output torque, actual output torque can controllably be dropped before the determined drop to avoid subjecting the operator to the uncontrolled, potentially more severe or dramatic drop.

In one exemplary transition in response to an operator request to increase output torque, the powertrain can provide a first increase in output torque using, for example, unused output torque capability of the torque generative devices presently being utilized. However, if the increase in requested output torque is greater than the capability of the currently utilized torque generative devices, an additional torque generative device might need to be engaged to deliver the requested increase. During this engagement of the additional torque generative device, the output torque capability of the powertrain might be temporarily reduced, resulting in a brief reduction in output torque. As the additional torque generative device is fully engaged, the powertrain is then enabled to deliver the full amount of the requested output torque, resulting in a subsequent second increase in output torque. As a result, in response to a simple request to increase output torque, operation of the associated powertrain includes a first increase, followed by a decrease, and finally a second increase in output torque. This varying response to the input of the operator can result in operator confusion or an adverse perception of the operation of the powertrain. Further, commanding the powertrain to constantly provide the maximum capability output torque can interfere with rapid progression of the transition and can lead to inefficient use of torque within the powertrain.

Control of output torque of a powertrain in response to an incipient transient speed event in the powertrain can include determining an estimated maximum output torque capability profile for the powertrain through an upcoming change in output torque and limiting the output torque of the powertrain to a minimum value of the estimated maximum output torque capability profile until the event is concluded. Benefits to drivability include stability in the output torque through the transition. By limiting the output torque to a fixed value that the powertrain can maintain through the transition, the rising and falling of the output torque according to the maximum output torque capability is avoided.

Further, benefits to drivability can include a reduced transition time period required to complete the transition. Referring to FIG. 1, electric motors 120 and 130 can, in one mode, cooperate to provide torque to planetary gear set 140 to provide output torque. According to an initial condition, electric motor 120 is providing a positive torque through shaft 135. Assuming a transition to a desired speed of shaft 135 of zero where initial output torque is to be maintained, torque must be increased by motor 130 to make up for the transition of shaft 135 and motor 120 to the zero speed. In a transition wherein the output torque is limited to the minimum value of an estimated maximum output torque capability profile, motors 120 and 130 are not necessarily controlled to their local maximum torque capacities. This flexibility, under some conditions, permits the powertrain to execute the transition more quickly. By reducing the powertrain output power, additional battery power for executing the speed change becomes available. That additional battery power can be utilized to expedite the transition. This exemplary transition is one non-limiting example wherein the time period required to complete the transition can be reduced by limiting the output torque through the transition.

An estimated maximum output torque can be projected through a time period based upon predicted operation of the powertrain. Methods to predict operation of the powertrain and estimate resulting output torque capacity of the powertrain are known in the art. An exemplary method to estimate output torque capacity of a powertrain is disclosed in commonly assigned and co-pending U.S. application Ser. No. 12/627,395, which is incorporated herein by reference.

Figure 2:
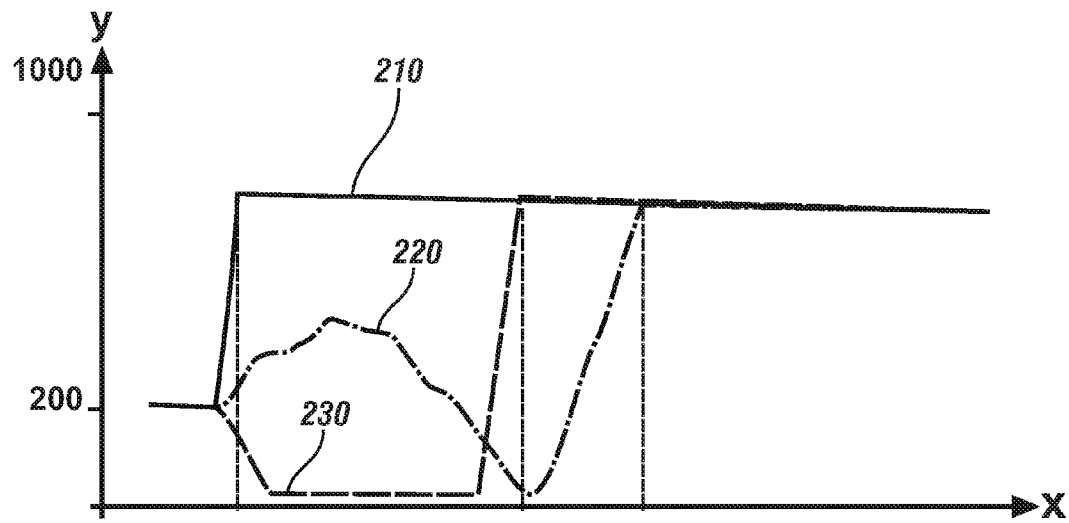
FIG. 2 illustrates an exemplary requested change in output torque and an associated transient speed event including output torque, wherein the powertrain is limited according to a minimum value of an estimated maximum output torque capability profile, in accordance with the present disclosure.

FIG. 2 illustrates a requested change in output torque and an associated transient speed event including output torque, wherein the powertrain is limited according to a minimum value of an estimated maximum output torque capability profile. A horizontal x-axis illustrates time in seconds, and a vertical y-axis illustrates output torque. Trace 210 illustrates $T_{O\_REQ}$, for example, from a foot pedal position of an operator. After an initial time, trace 210 increases sharply, indicating a requested change in output torque. Trace 220 illustrates an output torque that can be achieved by requiring the powertrain to produce a maximum output torque capability. As illustrated in trace 220, the output torque capability of the powertrain varies through the transition. This variance illustrates that changes within the powertrain through the course of the transition can have varying affects on the output torque capability of the powertrain. If the powertrain delivers this output torque in response to the pedal depression of the operator, the operator may perceive the rising and falling of the output torque as a failure or hesitation of the powertrain to meet the request. Trace 220 also represents an estimated maximum output torque capability profile that can be estimated for the transition and used in accordance with the present disclosure. Trace 230 illustrates an output torque that can be achieved by limiting the output torque to a minimum value of the estimated maximum output torque capability profile represented by trace 220. Trace 230, after an initial transition to the minimum value of the estimated maximum output torque capability profile, remains at that value until the powertrain has made all necessary changes for the transition and the $T_{O\_REQ}$ value can be achieved. Trace 230 illustrates that by limiting the output torque through the transition as indicated, the output torque is changed consistently and deliberately, such that the operator does not perceive the powertrain as attempting but failing to achieve the requested change. As illustrated in FIG. 2, some embodiments of transitions can be achieved in a shorter time period utilizing the method of trace 230 than if the powertrain is commanded to deliver the maximum output torque capability of the powertrain throughout the transitions as illustrated in trace 220.

Determination of a maximum output torque capability profile can be achieved through calibration by experimentation, computation, modeling or any method sufficient to predict operation of a powertrain through an incipient transient speed event. A plurality of maximum output torque capability profiles can be calibrated and stored for different powertrain configurations, operating ranges, and conditions. In one embodiment, a plurality of calibrated maximum output torque capability profiles can be stored in a look-up table. Based upon the incipient transient speed event and monitored operation of the powertrain, one of the plurality of calibrated maximum output torque capability profiles can be selected and a minimum value of the selected maximum output torque capability profile can be utilized to control the powertrain as disclosed herein. Monitoring operation of the powertrain can include, for example, monitoring or calculating a current or initial transmission output speed, $N_O$, and a difference between a desired transmission input speed and a current or initial transmission input speed. In the configuration of FIG. 1, input speed can be measured as the speed of motor 120.

In another embodiment, determination of the maximum output torque capability profile through an incipient transient speed event can be performed onboard the powertrain based upon currently monitored operation. A control system can be implemented monitoring operation of the powertrain, determining output torque capabilities of the powertrain through a transition based upon the monitored operation as a maximum output torque capability profile, and use a minimum value of the profile to control the powertrain through the transition. A number of methods to determine the maximum output torque capability profile are envisioned. In one embodiment, upon monitoring a requested change in output torque, a time period for the transition (transition time period) is estimated, and the time period is split or discretized to be represented by N number of points. Estimation of the time period for the transition can be computed, determined, or accessed from a reference table based upon any method sufficient to represent the response of the powertrain to a requested change in output torque. In an embodiment including a gear state change, hybrid drive configuration change, or other change requiring at least one clutch to change state, the transition can be based upon the clutch state change or changes involved in the transition. At each point, powertrain operation is monitored or calculated and a value of an output torque limit or capability is determined. The output torque capability values at each of the points collectively represent the maximum output torque capability profile. In one embodiment, the monitored or calculated operation of the powertrain includes monitoring or calculating a desired input acceleration and a desired input speed based upon the requested change in output torque; a motor speed for each motor of the powertrain; spin losses; motor power loss coefficients; and motor torque capabilities. By determining a minimum value of the determined maximum output torque capability profile, the powertrain can be controlled as disclosed herein. Further, by noting when the minimum value is estimated to occur in the transition, an initial change from the output torque prior to the requested change to the limited output torque value selected by the minimum value of the determined profile can be controlled to avoid the occurrence of the minimum output torque causing an impact to drivability during the initial transition.

A powertrain can apply torque in a positive direction, providing a propelling torque to an attached drivetrain, and a powertrain can apply a negative torque to the drivetrain, for example, using torque from slowing the drivetrain to recover energy to an energy storage device in a motor regeneration mode. The methods disclosed herein can be applied to torque in the positive direction, determining a minimum value of a positive maximum output torque capability profile, and the methods can alternatively or simultaneously be applied to torque in the negative direction, determining a maximum value of a negative minimum output torque capability profile. In this way, regardless of a current direction of requested output torque, operation of the powertrain through an incipient transient speed event will avoid drivability issues associated with dynamic capabilities of the powertrain to provide torque. A maximum output torque capability profile in a positive torque direction and minimum output torque capability profile in a minimum torque direction can each be selected from calibrated profiles or determining onboard the powertrain, and the output torque of the powertrain can be controlled or limited to remain between a minimum value of the positive maximum output torque capability profile and a maximum value of the negative minimum output torque capability profile through an incipient transient speed event.

Figure 3:
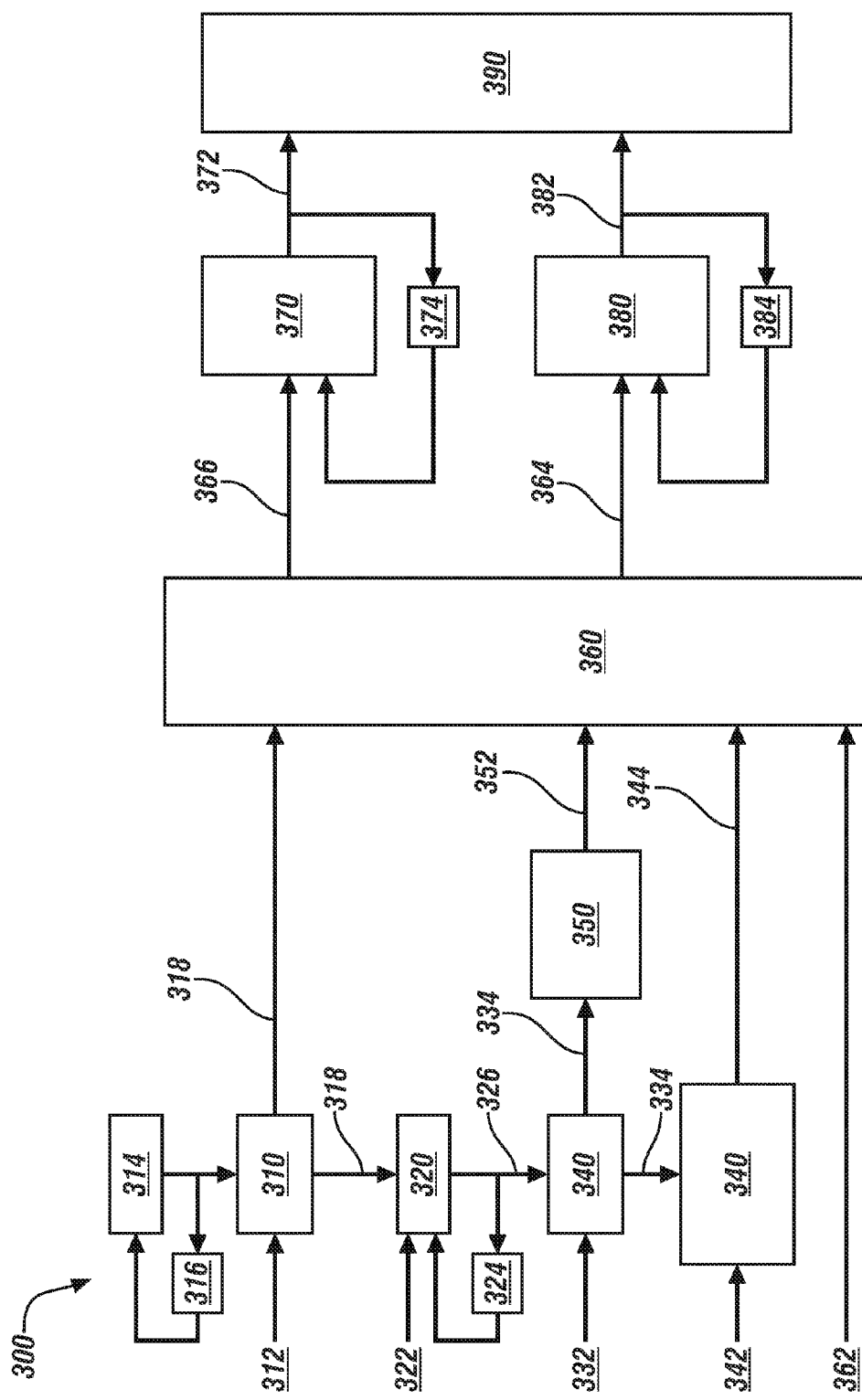
FIG. 3 illustrates an exemplary control system to determine an estimated maximum output torque capability profile, in accordance with the present disclosure.

FIG. 3 illustrates an exemplary control system to determine a maximum output torque capability profile. Table 1 is provided as a key wherein the numerically labeled modules and the corresponding functions are set forth as follows.

TABLE 1

| MODULE | MODULE CONTENTS |
|---|---|
| 310 | Calculate $N_{iDot}$ Profile |
| 320 | Calculate $N_i$ |
| 330 | Calculate $N_a$ and $N_b$ |
| 340 | Calculate $T_{aMax}$, $T_{aMin}$, $T_{bMax}$, and $T_{bMin}$ |
| 350 | Calculate Motor Power Coefficients |
| 360 | Determine Output Torque Limits at Current Loop Iteration |
| 370 | Keep Track of Minimum Value of $T_{OMax}$ (Min$T_{OMax}$) |
| 380 | Keep Track of Maximum Value of $T_{OMin}$ (Max$T_{OMin}$) |
| 390 | Ramp Output Constraints Up/Down to Min$T_{OMax}$ and Max$T_{OMin}$ |

Control system 300 is an onboard system that monitors operation of the powertrain, determines torque limits or capabilities for the powertrain, and sets constraints upon powertrain operation based upon the determined capabilities. Control system 300 can be operated within a single control module or spanned across a number of control modules. Module 310 monitors a shift time for a required shift or speed transition and a speed profile determined for an incipient transient speed event. Monitoring the speed profile can include monitoring a set of parameters representing the speed profile which will be used during the incipient transient speed event. Module 310 utilizes an iteration module 314 and 1/z module or unit delay module 316, providing a previous value of the term being calculated, to calculate an $N_{iDot}$ profile 318 through a series of projected discretized times $t_1$ through $t_n$, with the discretized times covering the entire transition being performed based upon the current requested change in output torque. Module 320 inputs $N_{iDot}$ profile 318 and an initial $N_i$ value 322, utilizes unit delay module 324, and outputs an $N_i$ value 326 for each discretized time. Module 330 monitors the $N_i$ value 326 for each discretized time $t_1$ through $t_n$ and an initial $N_O$ value 332 and outputs an estimated motor speed for each of the motors present, $N_a$ and $N_b$, for each discretized time 334. Module 340 monitors estimated motor speeds, $N_a$ and $N_b$, for each discretized time 334 and initial temperatures of each of the motors present 342 and outputs a maximum torque capability estimate in a positive direction for each of the motors present, $T_{aMax}$ and $T_{bMax}$, at each discretized time and a maximum torque capability estimate in a negative direction or a minimum torque capability estimate for each of the motors present, $T_{aMin}$ and $T_{bMin}$, at each discretized time, with the minimum and maximum values being output 344. Module 350 monitors estimated motor speeds, $N_a$ and $N_b$, for each discretized time 334 and calculates motor power coefficients for each motor for each discretized time 352. The motor power coefficients enable an estimate of each traction inverter's electrical power as a function of mechanical torque of the respective motor. One having ordinary skill in the art understands that the electrical power applied to a motor equals the mechanical power, for example, calculated as motor speed multiplied by motor torque, plus losses in the motor. Module 360 monitors $N_{iDot}$ profile 318, motor power coefficients for each motor for each discretized time 352, and minimum and maximum torque capabilities of each of the motors 344, additionally monitors battery power limits 362, and determines an output torque limit in a positive direction, $T_{OMax}$ 366, and in a negative direction, $T_{OMin}$ 364, for the powertrain at each discretized time $t_1$ through $t_n$. Module 360 outputs $T_{OMax}$ 366 and $T_{OMin}$ 364, which are examined, respectively, by modules 370 and 380, to determine a lowest absolute value for each signal through the discretized times $t_1$ through $t_n$ or a minimum for to $T_{OMax}$ and a maximum for $T_{OMin}$. Times whereat the minimum and maximum values are estimated can additionally be noted to permit the system to control output torque limits to ensure timely operation within the limits avoiding uncontrolled operation due to the minimum or maximum values. Unit delay modules 374 and 384 each respectively provide a previous value of the term being calculated for comparison. By iteratively comparing values through the range of projected times, 372 with a minimum value of the $T_{OMax}$ values (min$T_{OMax}$) and 382 with a maximum value of the $T_{OMin}$ values (max$T_{OMin}$) are determined and used in module 390 to control the powertrain. The depicted control system is one embodiment to employ the methods described herein, although a number of embodiments are envisioned and the disclosure is not intended to be limited to the particular exemplary embodiment disclosure herein.

Figure 4:
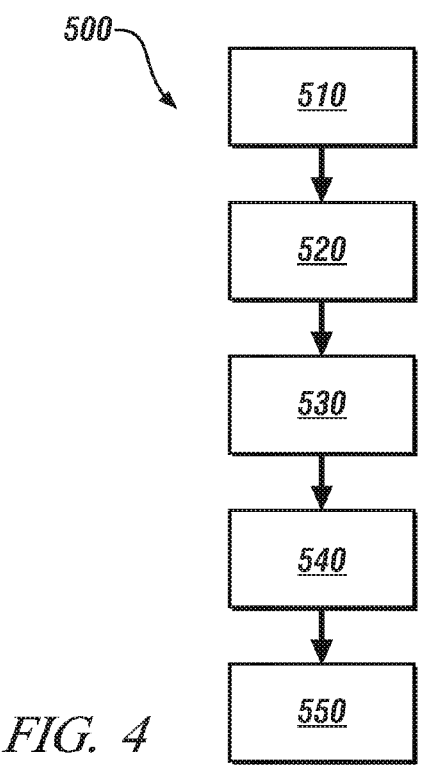
FIG. 4 illustrates an exemplary process to operate a powertrain based upon a determined minimum value of an estimated maximum output torque capability profile, in accordance with the present disclosure.

FIG. 4 illustrates an exemplary process to operate a powertrain based upon a determined minimum value of a maximum output torque capability profile. Table 2 is provided as a key wherein the numerically labeled modules and the corresponding functions are set forth as follows.

TABLE 2

| BLOCK | BLOCK CONTENTS |
|---|---|
| 510 | Determine an Incipient transient Speed Change |
| 520 | Monitor Operation of the Powertrain |
| 530 | Utilize an Onboard Control System to Determine a maximum Output Torque Capability Profile |
| 540 | Determine a Minimum Value of the Maximum Output Torque Capability Profile |
| 550 | Utilize the Minimum Value to Control the Powertrain |

Process 500 begins at block 510 wherein an incipient transient speed change is determined. In block 520, current operation of the powertrain is monitored. In block 530, an onboard control system is utilized to determine a maximum output torque capability profile based upon the incipient transient speed change and the monitored operation of the powertrain. A control system utilizing a table of calibrated maximum output torque capability profiles could be used instead of the onboard control system. In block 540, a minimum value of the maximum output torque capability profile is determined, and in block 550, the minimum value is utilized to limit the output torque of the powertrain through the transition associated with the incipient transient speed change.

Methods disclosed herein include determining a maximum output torque capability profile, determining a minimum value of the maximum output torque capability profile, and controlling output torque based upon limiting the output torque to be not greater than the minimum value of the maximum output torque capability profile. Exemplary embodiments describe this maximum output torque capability profile to include torque in a positive direction, providing propelling torque to the drivetrain. However, selection of the maximum output torque capability profile to correspond to a propelling torque is arbitrary, and the maximum output torque capability profile can equally be applied to a braking torque or a torque providing propelling torque in a reverse direction. The disclosure is not intended to be limited to the definition of the maximum output torque capability profile corresponding to a positive, propelling torque.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. System to control an output torque of a powertrain in response to an incipient transient speed event within the powertrain, comprising:
a control module configured to:
determine the incipient transient speed event;
determine a maximum output torque capability profile based upon the incipient transient speed event;
determine a minimum value of the maximum output torque capability profile;
determine a minimum output torque capability profile based upon the incipient transient speed event;
determine a maximum value of the minimum output torque capability profile; and
limit the output torque to between the minimum value of the maximum output torque capability profile and the maximum value of the minimum output torque capability profile until the incipient transient speed event is concluded.

2. The system of claim 1, further comprising:
an accelerator pedal providing an output torque request; and
wherein the control module configured to determine the incipient transient speed event further comprises the control module configured to determine the incipient transient speed event based upon the output torque request.

3. The system of claim 1, further comprising:
an energy storage device having a state of charge; and
wherein the control module configured to determine the incipient transient speed event further comprises the control module configured to determine a powertrain mode change based upon the estimated state of charge of the energy storage device.

4. The system of claim 1:
wherein the control module configured to determine the maximum output torque capability profile based upon the incipient transient speed event further comprises the control module configured to determine the maximum output torque capability profile in a first determination; and
wherein the control module configured to determine the minimum output torque capability profile based upon the incipient transient speed event further comprises the control module configured to determine the minimum output torque capability profile in a second determination.

5. The system of claim 1:
wherein the control module configured to determine the maximum output torque capability profile based upon the incipient transient speed event further comprises the control module configured to select one of a plurality of calibrated maximum output torque capability profiles as the maximum output torque capability profile; and
wherein the control module configured to determine the minimum output torque capability profile based upon the incipient transient speed event further comprises the control module configured to select one of a plurality of calibrated estimated minimum output torque capability profiles as the minimum output torque capability profile.

6. The system of claim 1, further comprising the control module configured to:
determine a time that the minimum value of the maximum output torque capability profile occurs; and
determine a time that the maximum value of the minimum output torque capability profile occurs; and
wherein limit the output torque is further based upon the time that the minimum value of the maximum output torque capability profile occurs and the time that the maximum value of the minimum output torque capability profile occurs.

7. The system of claim 4, further comprising:
the control module configured to determine a transition time period based upon the incipient transient speed event;
wherein the control module configured to determine the maximum output torque capability profile in the first determination further comprises the control module configured to determine a plurality of maximum output torque capability values at a plurality of points through the transition time period; and
wherein the control module configured to determine the minimum output torque capability profile in the second determination further comprises the control module configured to determine a plurality of minimum output torque capability values at the plurality of points through the transition time period.

8. Control module implemented method to control an output torque of a powertrain in response to an incipient transient speed event within the powertrain, the method comprising:
determining, by a controller, an incipient transient speed event;
determining, by a controller, a maximum output torque capability profile based upon the incipient transient speed event;
determining, by a controller, a minimum value of the maximum output torque capability profile; and
limiting, by a controller, the output torque to not greater than the minimum value of the maximum output torque capability profile until the incipient transient speed event is concluded.

9. The method of claim 8, further comprising:
determining, by a controller, a minimum output torque capability profile based upon the incipient transient speed event;
determining, by a controller, a maximum value of the minimum output torque capability profile; and
further limiting, by a controller, the output torque to not less than the maximum value of the minimum output torque capability profile until the incipient transient speed event is concluded.

10. The method of claim 8, wherein the incipient transient speed event comprises a transmission input speed change.

11. The method of claim 8, wherein the incipient transient speed event comprises a powertrain mode change.

12. The method of claim 8, wherein the incipient transient speed event comprises an electric motor speed change.

13. The method of claim 8, wherein the incipient transient speed event comprises an engine speed change.

14. The method of claim 8, further comprising determining, by a controller, a transition time period corresponding to the incipient transient speed event; and wherein determining, by a controller, the maximum output torque capability profile comprises determining a plurality of maximum output torque capability values at a corresponding plurality of points through the transition time period.

15. The method of claim 8, wherein determining, by a controller, the maximum output torque capability profile comprises:
monitoring operation of the powertrain; and
selecting one of a plurality of calibrated maximum output torque capability profiles as the maximum output torque capability profile based upon the incipient transient speed event and the monitored operation of the powertrain.

16. The method of claim 14, wherein determining, by a controller, the plurality of maximum output torque capability values comprises:
monitoring operation of the powertrain; and
determining the plurality of maximum output torque capability values based upon the monitored operation of the powertrain.

17. The method of claim 16, wherein monitoring operation of the powertrain comprises:
monitoring a shift time corresponding to the incipient transient speed event;
monitoring a speed profile corresponding to the incipient transient speed event;
monitoring an initial transmission input speed;
monitoring an initial transmission output speed;
monitoring an initial temperature of a first electric motor;
monitoring an initial temperature of a second electric motor; and
monitoring power limits of an energy storage device.

18. The method of claim 15, further comprising:
selecting one of a plurality of calibrated minimum output torque capability profiles as a minimum output torque capability profile based upon the incipient transient speed event and the monitored operation of the powertrain; and
further limiting the output torque to not less than the maximum value of the minimum output torque capability profile until the incipient transient speed event is concluded.

19. The method of claim 15, wherein monitoring operation of the powertrain comprises:
monitoring a current output speed; and
monitoring a difference between a current transmission input speed and a desired transmission input speed.

20. The method of claim 16, wherein determining, by a controller, the plurality of maximum output torque capability values based upon the monitored operation of the powertrain comprises:
determining an input acceleration profile based upon the shift time and the input speed profile;
determining an input speed at each of the plurality of points based upon the input acceleration profile and the initial transmission input speed;
determining a speed of the first electric motor at each of the plurality of points based upon the input speed at each of the plurality of points and the initial transmission output speed;
determining a speed of the second electric motor at each of the plurality of points based upon the input speed at each of the plurality of points and the initial transmission output speed;
determining estimated motor torque limits for the first electric motor at each of the plurality of points based upon the initial temperature of the first electric motor and the speed of the first electric motor at each of the plurality of points;
determining estimated motor torque limits for the second electric motor at each of the plurality of points based upon the initial temperature of the second electric motor and the speed of the second electric motor at each of the plurality of points;
determining motor power coefficients for the first electric motor and the second electric motor at each of the plurality of points based upon the speed of the first electric motor at each of the plurality of points and the speed of the second electric motor at each of the plurality of points; and
determining respective maximum output torque capability values at each of the plurality of points based upon the input acceleration profile, the motor power coefficients for the first electric motor and the second electric motor, the estimated motor torque limits for the first electric motor, the estimated motor torque limits for the second motor, and the power limits of the energy storage device.

* * * * *